United States Patent [19]
Perlowski et al.

[11] 3,997,771
[45] Dec. 14, 1976

[54] APPARATUS AND METHOD FOR PERFORMING AN ARITHMETIC OPERATION AND MULTIBIT SHIFT

[75] Inventors: Andrew A. Perlowski, Minnetonka, Minn.; Robert H. Wallace, Portsmouth, R.I.; Robert L. Magers, New Concorde, Ohio

[73] Assignee: Honeywell Inc., Minneapolis, Minn.

[22] Filed: May 5, 1975

[21] Appl. No.: 574,325

[52] U.S. Cl. .............................. 235/156; 340/172.5
[51] Int. Cl.² ......................................... G06F 7/38
[58] Field of Search .......... 235/156, 159, 160, 164; 340/172.5

[56] References Cited

UNITED STATES PATENTS

| | | | |
|---|---|---|---|
| 3,293,420 | 12/1966 | Pitkowsky et al. | 235/164 |
| 3,697,734 | 10/1972 | Booth et al. | 235/164 |
| 3,800,130 | 3/1974 | Martinson et al. | 235/156 |
| 3,861,585 | 1/1975 | Courboulay et al. | 235/164 |
| 3,875,391 | 4/1975 | Shapiro et al. | 235/156 |
| 3,887,799 | 6/1975 | Lindgren | 235/164 |

OTHER PUBLICATIONS

Sofer & Sproul, "Parallel Pipeline Organization of Execution Unit," *IBM Tech. Disclosure Bulletin.* vol. 14 No. 10 Mar. 1972, pp. 2930–2933.

*Primary Examiner*—David H. Malzahn
*Attorney, Agent, or Firm*—Allegretti, Newitt, Witcoff & McAndrews

[57] ABSTRACT

The disclosure describes an improved apparatus and method for performing an arithmetic operation and multibit shift on two digital numbers during a single pass of the numbers through the arithmetic and shifting apparatus. In order to reduce the time required for the operation, the digital numbers are stored in registers which can be read simultaneously.

8 Claims, 7 Drawing Figures

APPARATUS AND METHOD FOR PERFORMING AN ARITHMETIC OPERATION AND MULTIBIT SHIFT

The invention herein described was made in the course of or under a contract or subcontract thereunder, with the Department of the Air Force.

BACKGROUND AND SUMMARY OF THE INVENTION

This invention relates to data processing techniques and more particularly relates to such techniques in which the data is shifted.

In U.S. Pat. No. 3,818,203, issued June 18, 1974, the applicants described an improved matrix shifter capable of performing multibit shifts in an amount of time independent of the number of shifts performed. This is accomplished by the use of a connection matrix and selective gating of input lines to output lines, thereby introducing only one gate delay from input to output of data. The applicants have discovered that this matrix shifter can be combined with additional digital apparatus in order to substantially reduce the time previously required in order to perform arithmetic and shifting operations on digital data.

According to one feature of the invention, the matrix shifter can be combined with an arithmetic and logic unit, as well as a memory or register file which is capable of reading two digital numbers stored in the file onto two separate output busses. The digital numbers read out of the register file are transmitted to the arithmetic and logic unit and to the matrix shifter before the resulting digital number is stored. By using this architecture, digital numbers can be subjected to an arithmetic operation and multibit shift during a single pass through the arithmetic and logic unit and matrix shifter.

According to another feature of the present invention, techniques of the above-described type can be improved by using simultaneous access memories or register files in which two different registers are simultaneously accessed through output ports and perform a write to one of the registers. By using this feature, the time required for reading two numbers from different registers, performing an arithmetic operation on the numbers which creates a resultant number and performing a multibit shift on the resultant number is drastically reduced. This feature permits the execution of register dyadic operations in a single cycle with a single clock pulse.

The applicants have found that the foregoing techniques can be used to improve the execution of dyadic fixed point operations, algorithms, such as multiply and divide, floating point operations and bit maneuvering. If the above-described techniques are used, these operations can be performed with a degree of speed and simplicity heretofore unavailable by using more conventional cumputer architecture.

DESCRIPTION OF THE DRAWINGS

These and other advantages and features of the present invention will hereafter appear in connection with the accompanying drawings wherein.

DESCRIPTION OF THE PREFERRED EMBODIMENT

Figure 1:
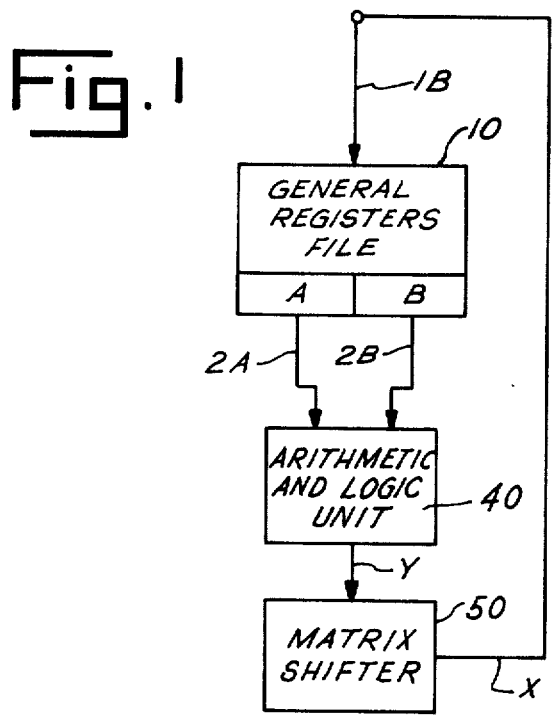
FIG. 1 is a block diagram of a preferred form of data processing apparatus made in accordance with the present invention.

Referring to FIG. 1, a preferred form of apparatus made in accordance with the present invention basically comprises a general register file 10, having output ports A and B, an arithmetic and logic unit 40 which is connected to the general register file over busses 2A and 2B, and a matrix shifter 50 which is connected to the output of unit 40 by a bus Y.

Figure 2:
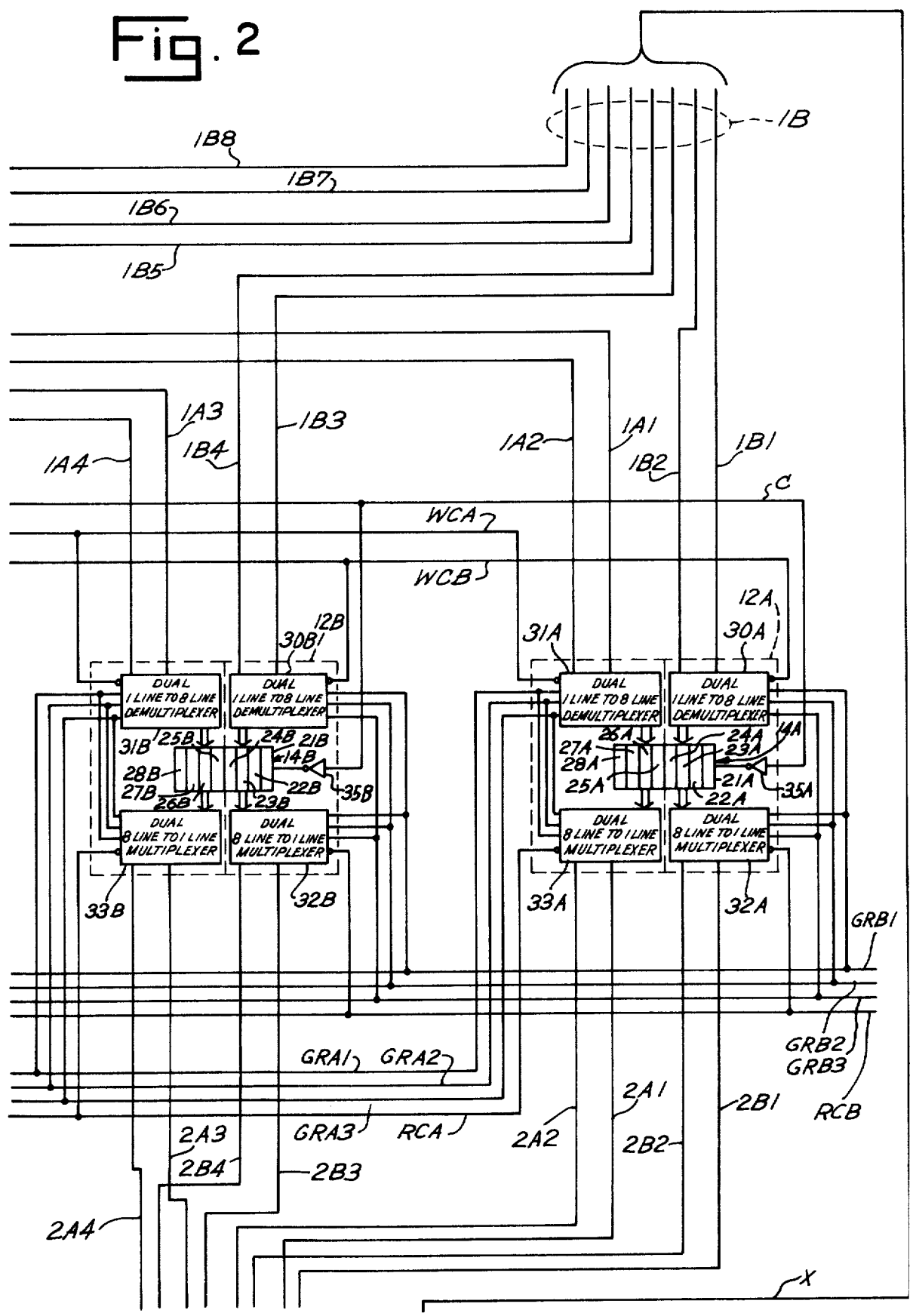
FIGS. 2, 3 and 4 are electrical schematic drawings showing circuit details of the apparatus illustrated in FIG. 1.
Figure 3:
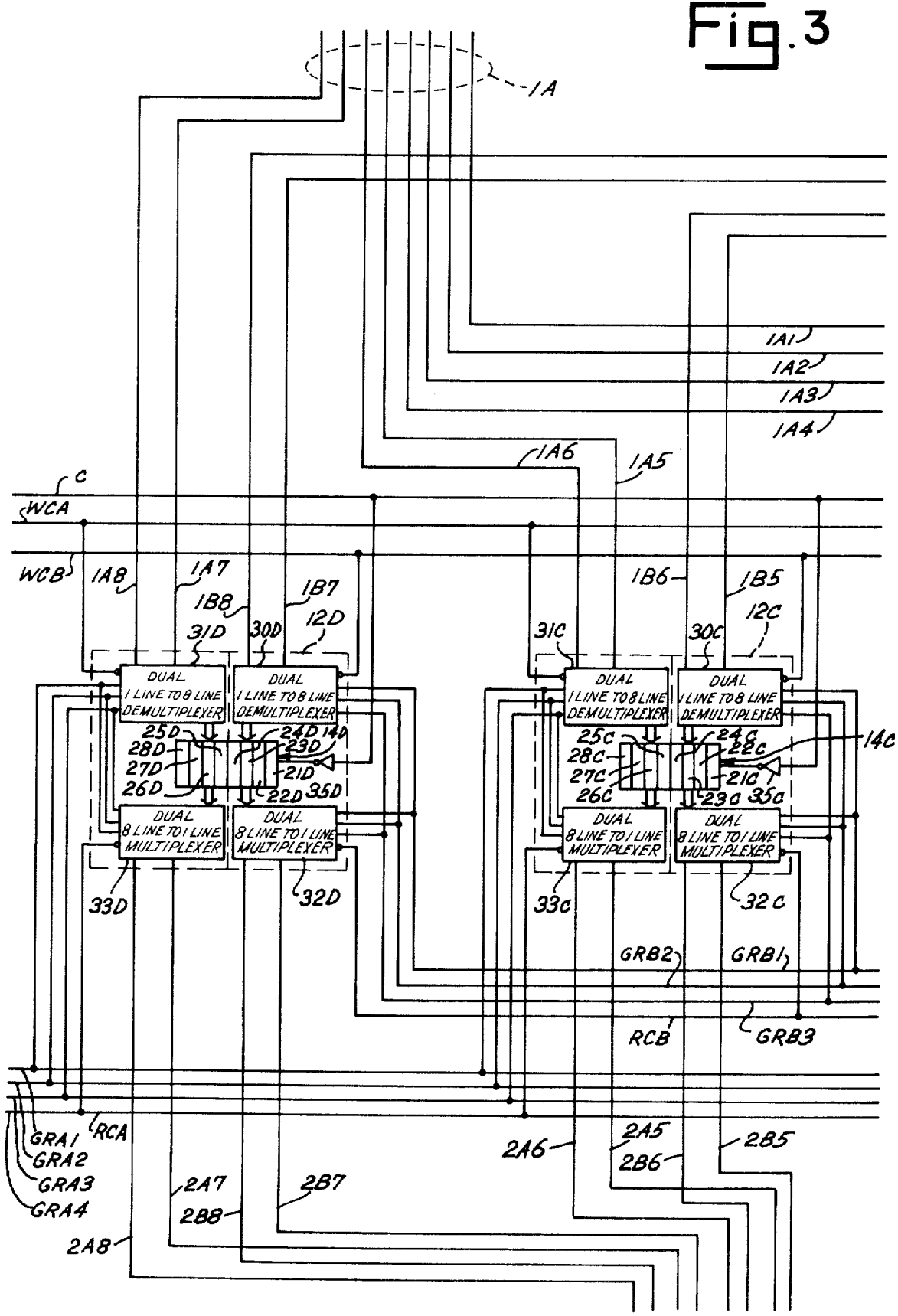

Referring to FIGS. 2 and 3, general register file 10 more specifically comprises register assemblies 12A–12D. Each register assemblies 12A–12D is identical, and may be understood from the following discussion of exemplary register assembly 12A.

Register assembly 12A can be implemented by type SN74172 multiple port register files manufactured by Texas Instruments, Inc. As shown in FIG. 2, assembly 12A comprises an 8 word by 2 bit storage register file 14A which can be functionally divided into registers 21A–28A. data is written into the registers by dual 1 line to 8 line demultiplexers 30A, 31A through input conductors 1B1, 1B2 and 1A1, 1A2, when enabled by write enable conductors WCB and WCA, respectively.

Data is read out of the registers by dual 8 line to 1 line multiplexers 32A, 33A through output conductor pairs 2B1, 2B2 and 2A1, 2A2 when enabled by read enable conductors RCB and RCA. The register in group 21A–28A which receives data from conductor pair 1B1, 1B2 or which reads data onto conductor pair 2B1, 2B2 is identified and enabled by the address signals on address lines GRB1–GRB3. The register which receives data from conductor pair 1A1, 1A2 or which reads data onto conductor pair 2A1, 2A2 is identified and enabled by the address signals on address lines GRA1–GRA3. An inverter 35A receives a clock pulse over conductor C which enables data to be written in one of registers 21A–28A.

The demultiplexers and multiplexers are arranged in a well known manner so that any register can store data received on either input conductor pair 1A1, 1A2 or pair 1B1, 1B2, and any register can read out data either to conductor pair 2A1, 2A2, or to conductor pair 2B1, 2B2. In addition, the data held in two separate registers can be simultaneously accessed and read out onto the output conductor pairs. For example, the data in register 21A can be read out to output conductor pair 2B1, 2B2 at the same time that data stored in register 22A is read out to output conductor pair 2A1, 2A2.

Register assemblies 12B–12D are constructed like register assembly 12A. Parts within register assemblies 12B–12D are identical to the like-numbered parts in register assembly 12A and may be understood from the foregoing description of register assembly 12A.

Conductors 1B1–1B8 form an 8-bit data input bus 1B; conductors 1A1–1A8 form an 8-bit data input bus 1A; conductors 2B1–2B8 form an 8-bit data output bus 2B; and conductors 2A1–2A8 form an 8-bit data output bus 2A.

Figure 4:
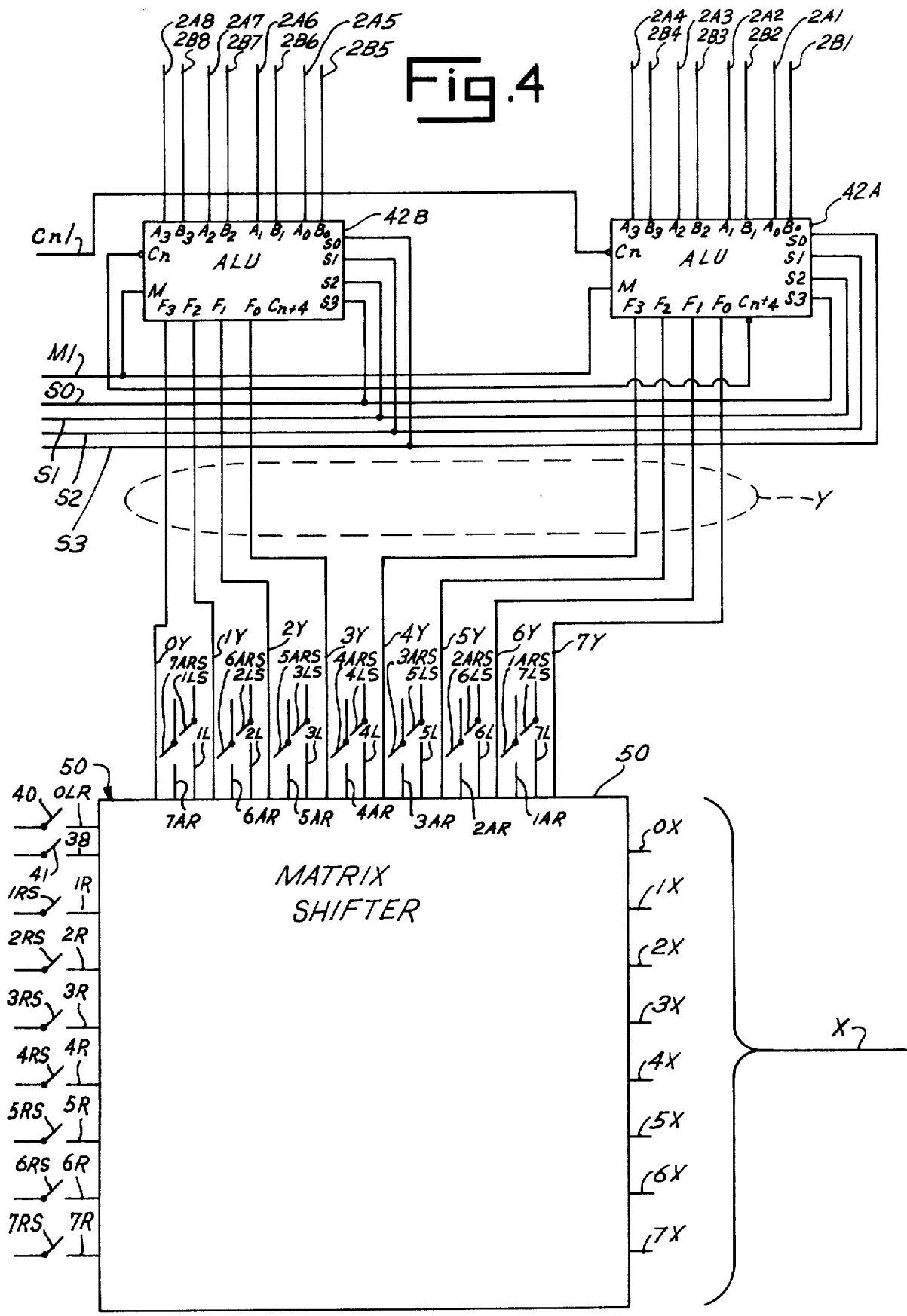

Referring to FIG. 4, arithmetic and logic unit 40 comprises two identical units 42A, 42B which can be implemented by type SN74181arithmetic logic units manufactured by Texas Instruments, Inc. Unit 42A performs arithmetic or logical operations on a digital number conductor to inputs B0–B3 and a separate digital number conducted to inputs A0–A3 in order to form a resultant digital number which is conducted to outputs F0–F3. A carry input Cn of unit 42B receives data from a carry output CN + 4 of unit 42A. A carry input conductor Cn of unit 42A receives data from a separate input conductor Cnl. Input M is a mode control input which determines whether an arithmetic or logical operation is to be performed by unit 42A. Inputs S0–S3, which are controlled by like-numbered conductors, determine the type of arithmetic or logic operation performed by unit 42A (e.g., addition or substraction).

Unit 42B is identical to unit 42A and can be understood from the foregoing description. It should be noted that outputs F0–F3 of units 42A and 42B are combined in order to form an 8-bit output bus Y which includes conductors 0Y–7Y.

Referring to FIG. 4, matrix shifter 50 is described in detail in U.S. Pat. No. 3,818,203, issued June 18, 1974, which is incorporated by reference. Each of the elements of matrix shifter 50 identified in FIG. 4 corresponds to the like-numbered element described in U.S. Pat. No. 3,818,203. As shown in FIGS. 4 and 2, output conductors 0X–7X from matrix shifter 50 are joined with conductors 1B1–1B8 of bus 1B, respectively.

Dyadic fixed point operations, such as add and substract, can be accomplished by a single pass of data through unit 40 and shifter 50 in the following example. In order to provide an example which illustrates the capabilities of the system, it will be assumed that the digital number held in registers 21A–21D is to be added to the digital number stored in registers 22A–22D in order to form a resultant digital number. The resultant digital number is then to be shifted 3-bit positions to the right, and the shifted resultant digital number is to be stored in registers 22A–22D.

Figure 5:
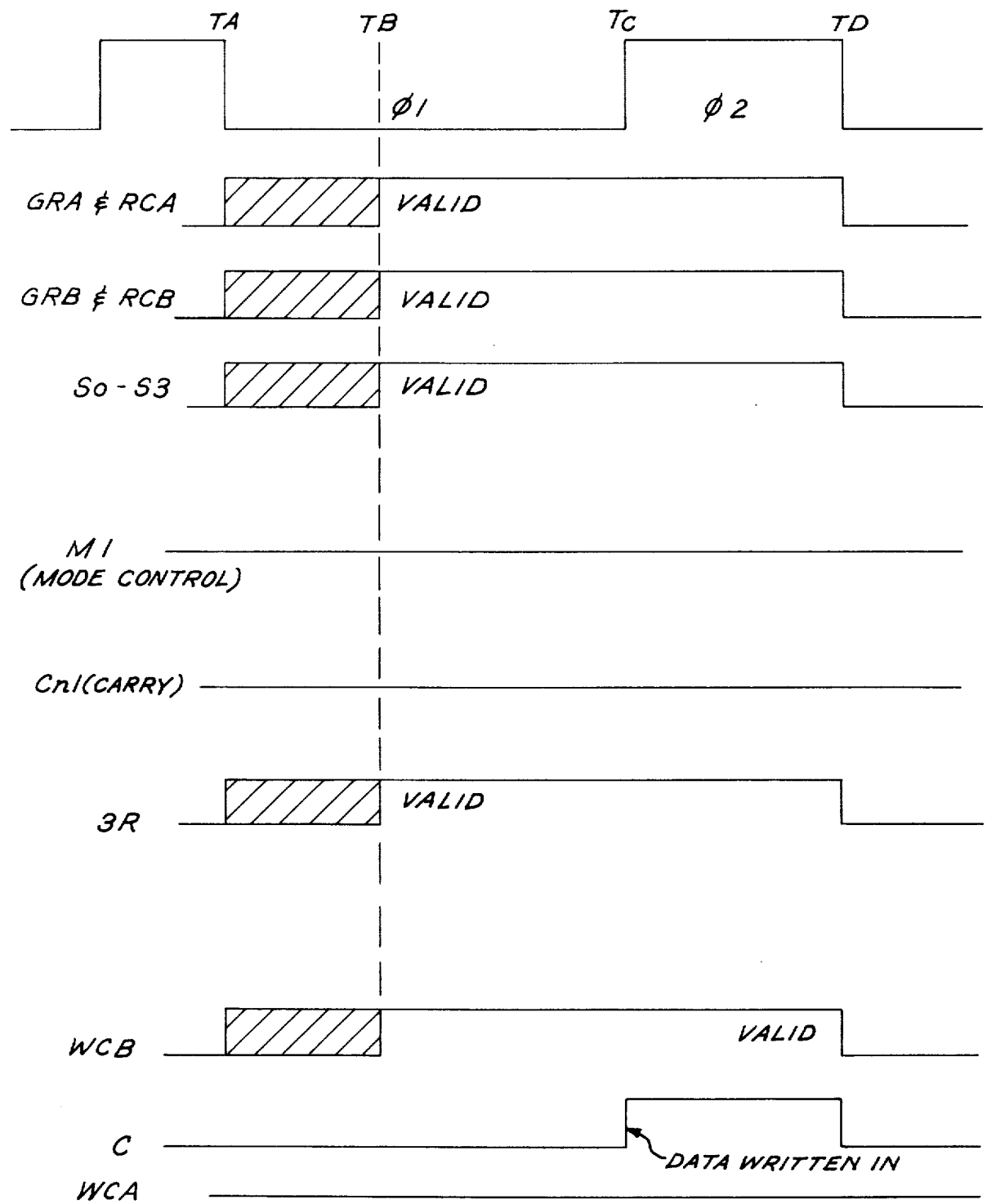
FIG. 5 is a timing diagram which functionally describes the relative time periods during which various components of circuitry shown in FIGS. 2–4 operate.

Referring to FIG. 5, this operation is performed in two phases, Phase 1 and Phase 2. Phase 1 extends from time TA to time TC during which the arithmetic and shifting operations are performed. Phase 2 extends from time TC to time TD during which the shifted resultant digital number is stored in registers 22A–22D.

At time TA, the appropriate GRA and RCA signals are applied to conductors GRA1–GRA3 and RCA in order to read the digital number stored in registers 21A–21D onto output bus 2A. At the time (i.e., time TA), the appropriate GRB and RCB signals are applied to conductors GRB1–GRB3 and RCB in order to read the digital number stored in registers 22A–22D onto output bus 2B. Also at time TA, signals S0–S3 are applied to the like-numbered conductors to initiate and add function. The Ml and Cn conductors are retained at a logical 0 state in order to indicate that an arithmetic function is to be performed and that the input carry to unit 42B is zero. Also at time TA, a 3R signal is applied to the 3R conductor of matrix shifter 50 in order to initiate a shift 3 bits to the right.

In response to the GRA, GRB RCA and RCB signals, the digital numbers stored in registers 21A–21D and 22A–22D are substantially simultaneously read out onto output busses 2A and 2B. At approximately time TB, the data on the output busses becomes sufficiently stable so that arithmetic and logic units 42A and 42B can perform an add operation on the digital numbers in order to produce a resultant digital number. Also at approximately time TB, the resultant digital number is conducted to the matrix shifter and is shifted 3 bits to the right.

Sometime during Phase 1, and preferably at time TA, a WCB signal is applied to the like-lettered conductor so that the shifted resultant digital number will be written into registers 22A–22D. However, the number is not written into the registers until the clock pulse C is applied to conductor C at time TC. Shortly after time TC, the shifted resultant digital number is conductor over busses X ans 1B and is stored in registers 22A–22B. At time TD, all of the foregoing signals are returned to a logical zero state so that another cycle of operation may begin.

Phase 1 must be of sufficient time duration to insure the propagation of all control and data signals. A typical duration may be on the order of 100 to 300 nanoseconds. Phase 2 must provide sufficient time to allow the write operation to occur in the general registers. After this, Phase 2 can be terminated in order to commence another Phase 1 operation. The simplicity of the control signals needed in order to perform complex operations, such as arithmetic and shifting operations, greatly simplifies the control of the overall apparatus.

Figure 6:
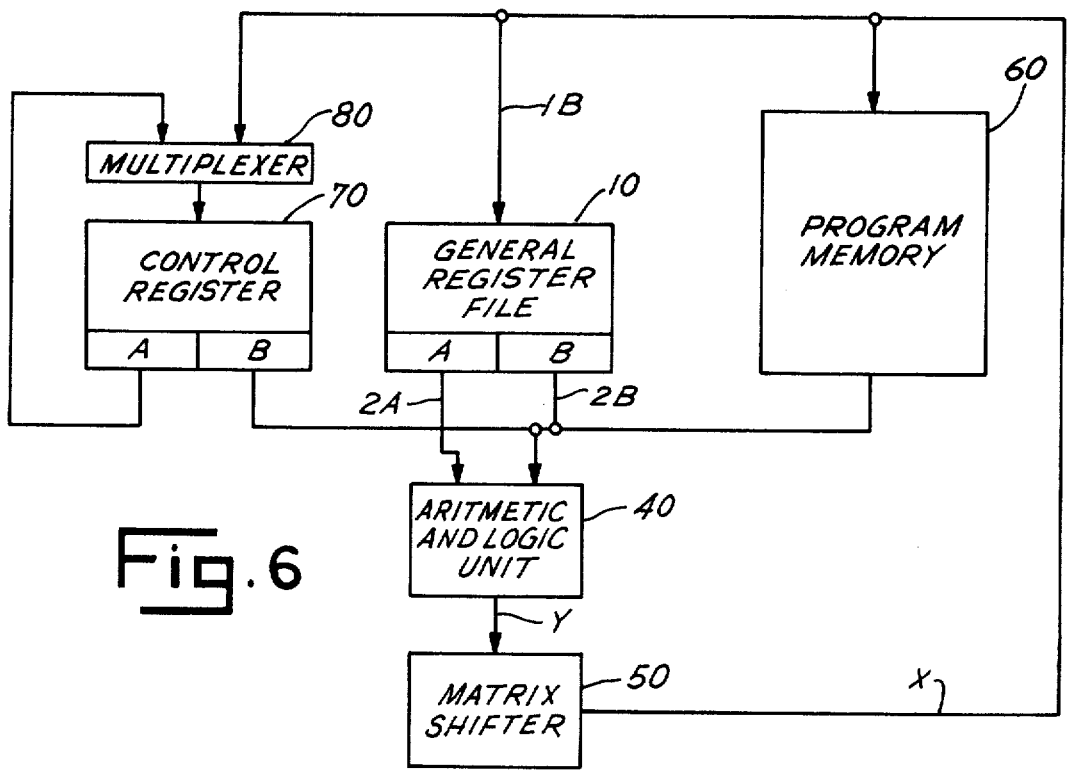
FIG. 6 is a block diagram illustrating one form of data processing apparatus in which the apparatus shown in FIG. 1 can be used to an advantage.

FIG. 6 illustrates one environment in which the present invention may be used to advantage In addition, to the apparatus described in FIG. 1, the system of FIG. 6 adds a conventional program memory 60, control register 70, which is identical to general register file 10, and a multiplexer 80 which controls the input of data to control register 70. The system shown in FIG. 6 can be used in order to perform typical arithmetic algorithms, such as multiply and divide. The multiply and divide algorithms most commonly implemented, Such as Booth and Booth or the non-restoring division, are realized with a series of add and substract shift operations. The position of matrix shifter 50 underneath the arithmetic and logic unit 40 permits the sequence to be performed in a single pass of data. At the same time the operands are being modified by the main path of the processor, the A output of control register 70 can be used for monitoring the multiplier or the A output-to-input loop can be utilized for generation of a quotient. This arrangement effectively doubles the width of the processor and speeds up the instruction execution.

In addition to the foregoing advantages, the existence of matrix shifter 50, arranged as shown in FIG. 6, enables the economical implementation of previously discarded repetitive algorithms, such as the CORDIC algorithm.

Figure 7:
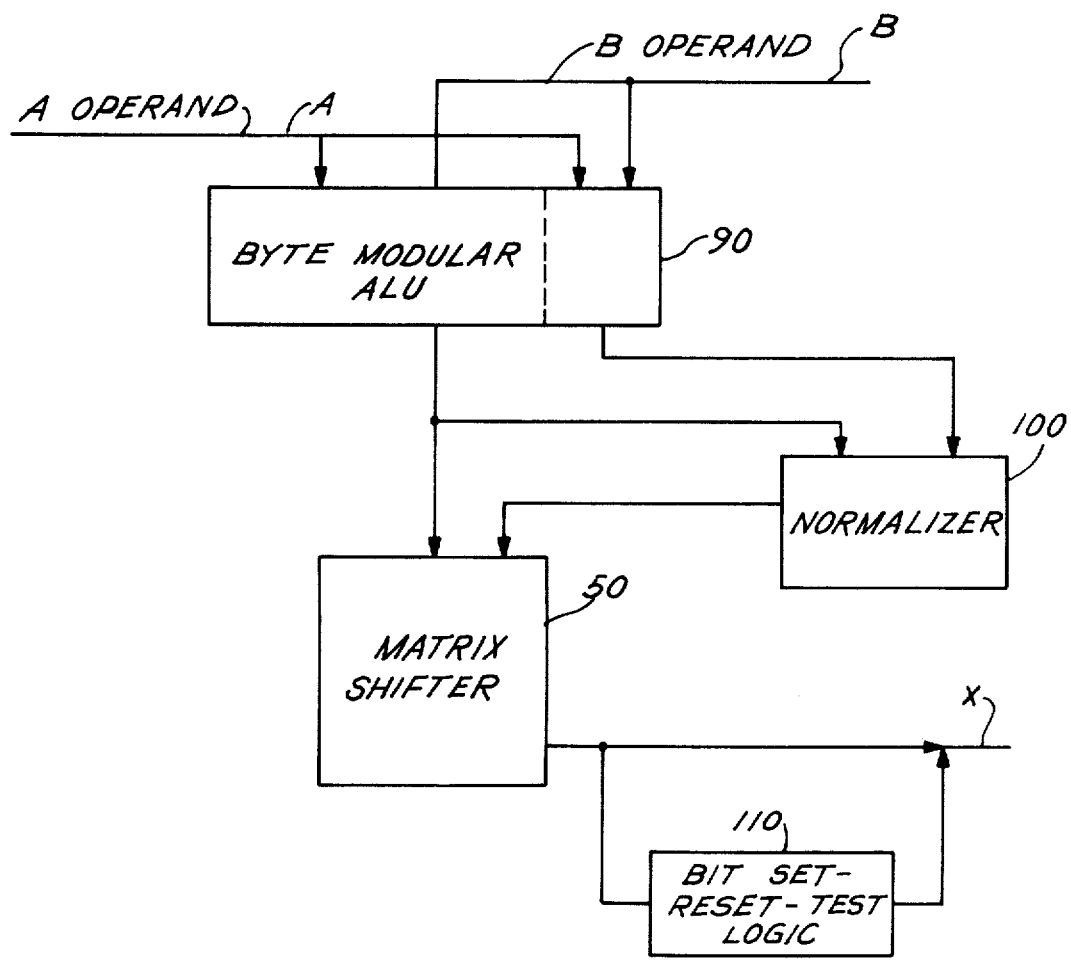
FIG. 7 is a block diagram illustrating additional apparatus which may be added to the apparatus shown in FIG. 6 in order to perform certain types of processing operations.

FIG. 7 illustrates another environment in which the preferred embodiment of the invention may be used in order to enable the improved execution of floating point operations and bit maneuvering. Referring to FIG. 7, the arithmetic and logic unit 40 should be modified as shown to form a byte modular arithmetic logic unit (ALU) 90. The outputs of the byte modular ALU are connected to a conventional normalizer 100 and to matrix shifter 50. One bit of the output of the matrix shifter is conducted through a bit set-reset-test logic circuit 110 conventional design before the bit rejoins output bus X.

Floating point arithmetic requires a data word which contains two sets of information: the data (fraction) and the exponent. Referring to FIGS. 6 and 7, assuming the data word has the foregoing format, floating point operations can be performed in the following manner:

Pass 1 — operands A and B are brought out onto the A and B busses and by the use of byte modular ALU 90, the exponents are compared. The difference between the exponent is applied to the control matrix shifter 50 and a right arithmetic shift is performed on the fraction of one of the operands in order to adjust the magnitude of the operand. The adjusted operand is stored in control register 70.

Pass 2 — A new operand is brought out onto the B bus while the non-corrected operand is placed on the A bus and the operation is performed on the fraction of the operands (3 bytes). The results are stored in control register 70.

Pass 3 — The resultant data is brought back out of the B bus, and the post normalization is performed by the use of priority encoders. The priority encoders determined the necessary shift and the value which modifies the exponent. This value is used to augment the final exponent as well as to shift the fraction of the operand to the left. The value is directly applied to control matrix shifter 50 and the result is stored in the instruction specified register in general register file 10.

The use of matrix shifter 50, together with the other apparatus shown in FIGS. 6 and 7, greatly reduces the hardware required for bit maneuvering. To test the bit, the operand is shifted to the left such that the bit under test appears as the left-most bit. Logic circuit 110 is used to perform the test and to change the required condition codes. The operation takes one pass, and the operand can be destroyed.

To set or reset a bit, two passes are required. During the first pass, the operand is rotated left by matrix shifter 50 such that the bit appears at the left-most position. The bit is modified as required at the output of matrix shifter 50, and the results are stored in one of the registers of file 10. On the second pass, the operand is rotated right to the original position and stored in a general register specified by the instruction within file 10. The hardware necessary for modification of the bit can consist of a couple of logic gates within circuitry 110.

Those skilled in the art will recognize that the preferred form of the invention herein has many other uses and may be modified from the form described herein without departing from the true spirit and scope of the invention as defined in the appended claims.

What is claimed is:

1. Digital apparatus for performing an arithmetic operation on a first digital number and a second digital number to obtain a resultant digital number and for shifting the bits of the resultant digital number before the resultant digital number is stored, said apparatus comprising:
   first register means for storing the first digital number;
   second register means for storing the second digital number;
   arithmetic means for performing an arithmetic operaion on the first digital number and the second digital number to form the resultant digital number, said arithmetic means comprising a first input for receiving the first digital number from the first register means and a second input for receiving the second digital number from the second register means;
   shifter means including a shifter input and a shifter output for performing a multibit shift in a predetermined direction on the resultant digital number during a single transmission of the resultant digital number from the shifter input to the shifter output in response to a shift control signal;
   control means for reading the first and second digital numbers out of the first and second register means, conducting the first digital number to the first input and conducting the second digital number to the second input, so that the resultant digital number is produced and for transmitting the shift control signal to the shifter means so that the resultant digital number can be shifted immediately in a predetermined direction;
   means for transmitting the resultant digital number from the arithmetic means to the shifter input, whereby the shifted resultant digital number is produced;
   a storage register; and
   means for storing the shifter resultant digital number in the storage register.

2. Apparatus, as claimed in claim 1, wherein the storage register comprises the first register means.

3. Apparatus, as claimed in claim 1, wherein the control means comprises means for reading the first and second digital numbers out of the first and second register means substantially simultaneously.

4. Apparatus, as claimed in claim 3, wherein the control means comprises:
   a first output port;
   a second output port;
   means for selectively transmitting the contents of the first register means to either the first output port or the second output port and for selectively transmitting the contents of the second register means to either the first output port or the second output port.

5. Apparatus, as claimed in claim 1, wherein digital apparatus includes a main memory and wherein the storage register is located in the main memory of the digital apparatus.

6. Apparatus, as claimed in claim 1, wherein the shifter means comprises means for handling digital data in the form of N information bits represented by discrete logic states including a plurality of N input conductors representing bit positions 0 through N minus 1, wherein N is a positive integer, improved apparatus for shifting the data with respect to the bit positions comprising:
   N output conductors representing bit positions O through N minus 1;
   a zero shift conductor for transmitting a zero shift signal;
   zero shift switch means operatively connecting each input conductor to a corresponding output conductor representing a like bit position for switching each output conductor to the same logic state as the corresponding input conductor in response to the zero shift signal;
   right shift conductors representing right bit position shifts;
   right shift switch sets representing right bit position shifts, each switch set being operated by one of said right shift conductors representing a like right bit position shift;
   right shift switch means in each right shift switch set for operatively connecting one of said input conductors to one of said output conductors representing a bit position exceeding the bit position of said one input conductor by the number of right bit position shifts represented by the right shift conductor operating the switch means;

left shift conductors representing left bit position shifts;

left shift switch sets representing left bit position shifts, each switch set being operated by one of said left switch conductors representing a like left bit position shift;

left shift switch means in each left shift switch set for operatively connecting one of said input conductors to one of said output conductors representing a bit position less than the bit position of the one input conductor by the number of left bit position shifts represented by the left shift conductor operating the left shift switch means;

first control means for shifting the data present on the input conductors to the right by energizing the right shift conductor representing the number of right bit positions to be shifted;

second control means for shifting the data present on the input conductors to the left by energizing the left shift conductor representing the number of left bit positions to be shifted;

third control means for rotating the data present on the input conductors to the right by energizing the right shift conductor representing the number of right bit positions to be rotated and by energizing the left shift conductor representing N minus the number of right bit positions to be rotated; and fourth control means for rotating the data present on the input conductors to the left by energizing the left shift conductor representing the number of left bit positions to be rotated and by energizing the right shift conductor representing N minus the number of left bit positions to be rotated.

7. A method for rapidly processing a first digital number stored in a first register and a second digital number stored in a second register by means of an arithmetic unit and a shifter, said method comprising the steps of:

substantially simultaneously reading the first and the second digital numbers out of the first and second registers;

performing an arithmetic operation on the first and second digital numbers to form a resultant digital number;

selecting the number of bits and direction which the resultant digital number is to be shifted;

performing a multibit shift on the resultant digital number by passing the resultant digital number through the shifter a single time before the resultant digital number is stored; and storing the multibit shifted resulting digital number.

8. A method, as claimed in claim 7, wherein the first and second registers, the arithmetic unit and the shifter are each enabled during the same time period, whereby the multibit shifted resultant digital number is produced by a single operation of the arithmetic unit and the shifter.

* * * * *